Jan. 10, 1950 J. S. HARKER 2,494,387
GLASS WORKING MACHINE
Filed Sept. 10, 1943 8 Sheets-Sheet 2

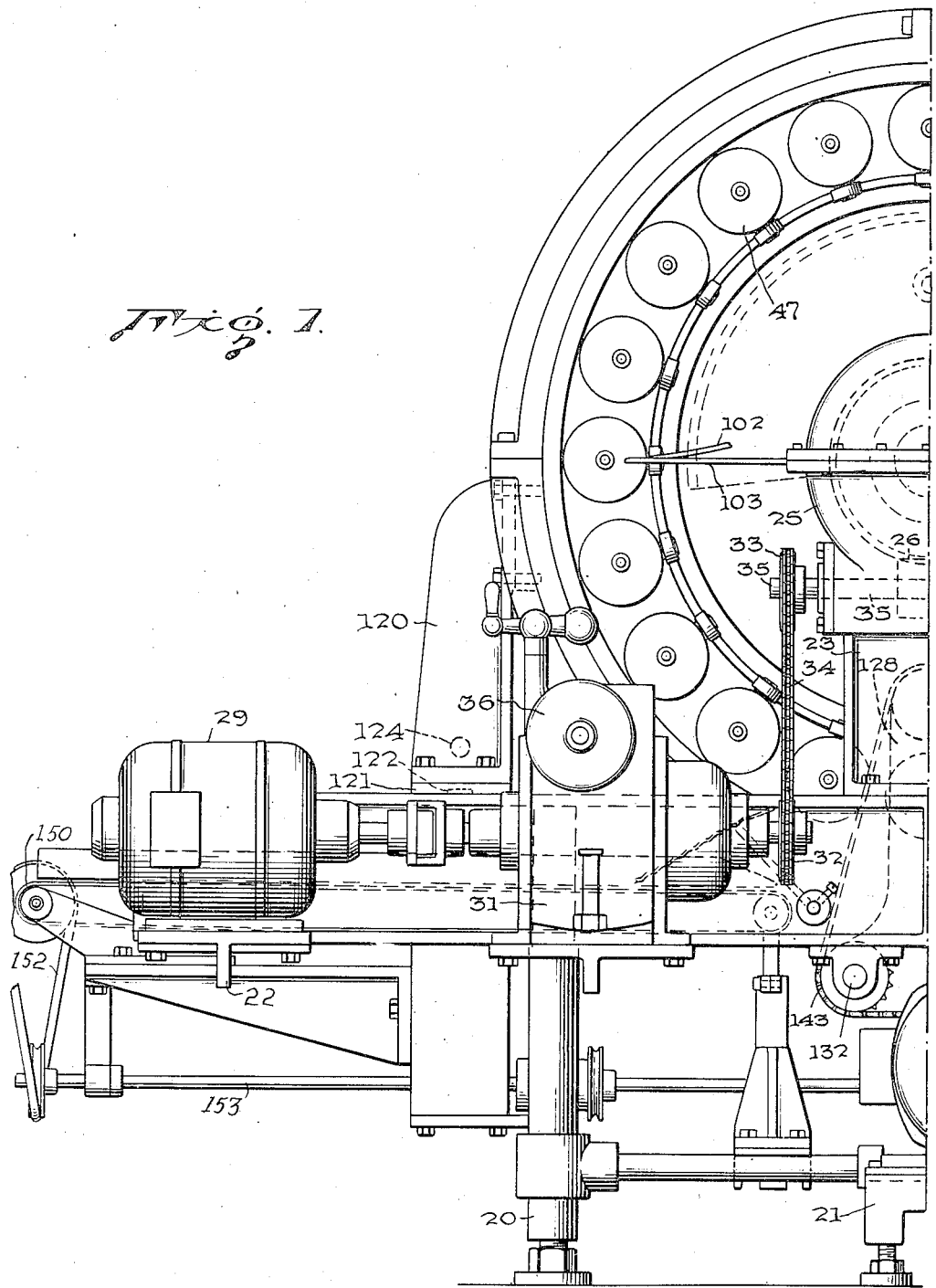

INVENTOR.
JOHN S. HARKER
BY George A. Degnan
ATTORNEY

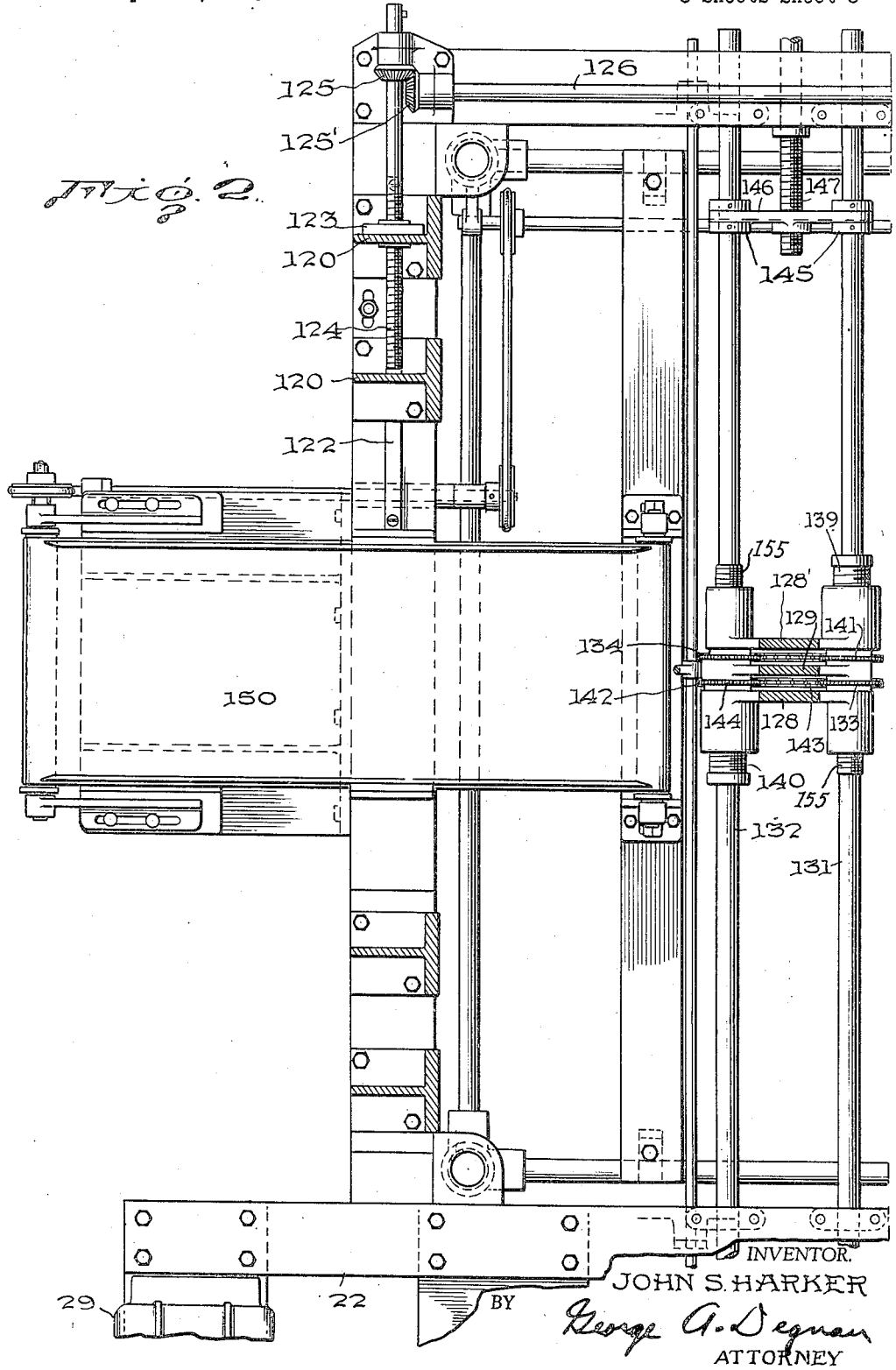

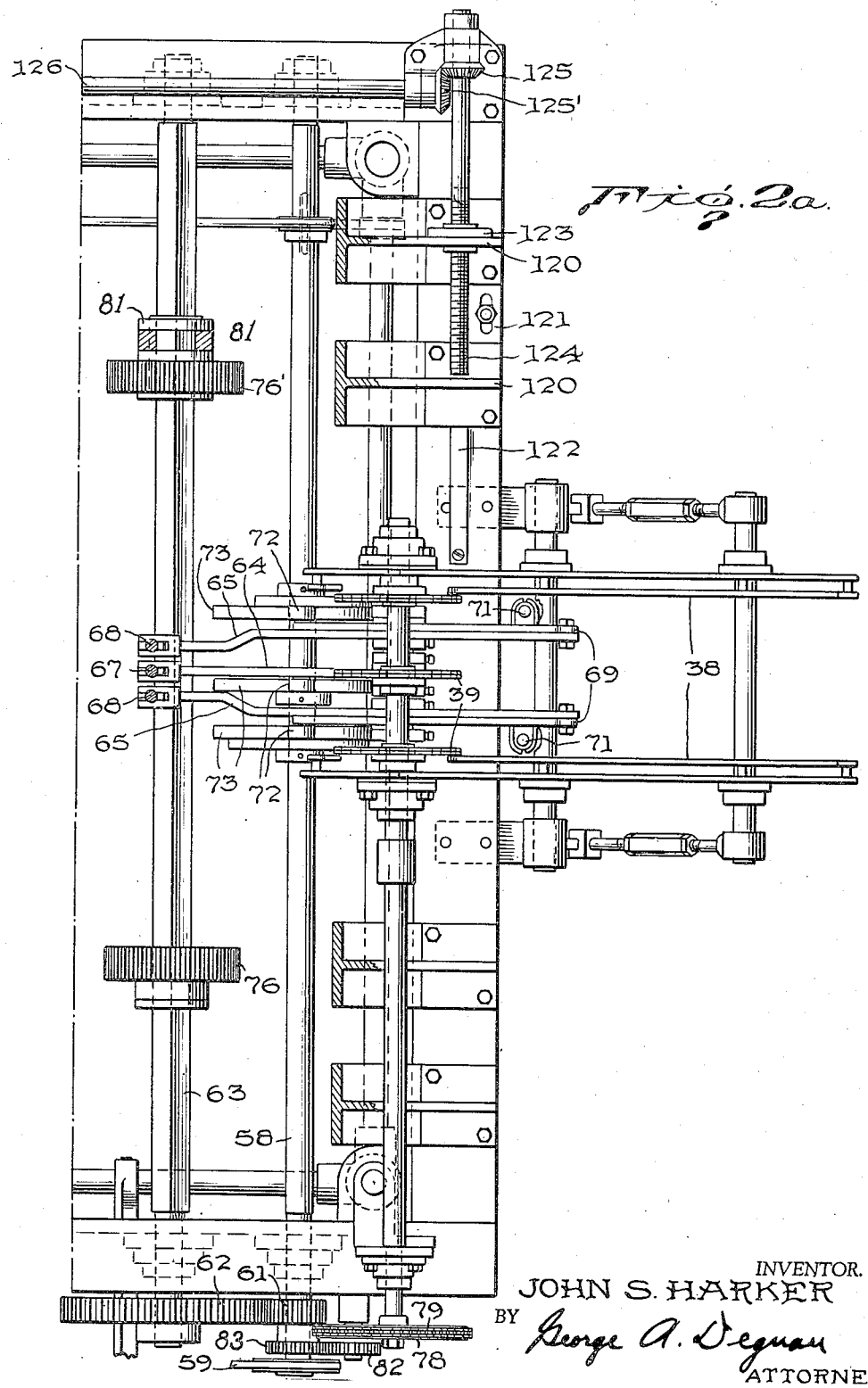

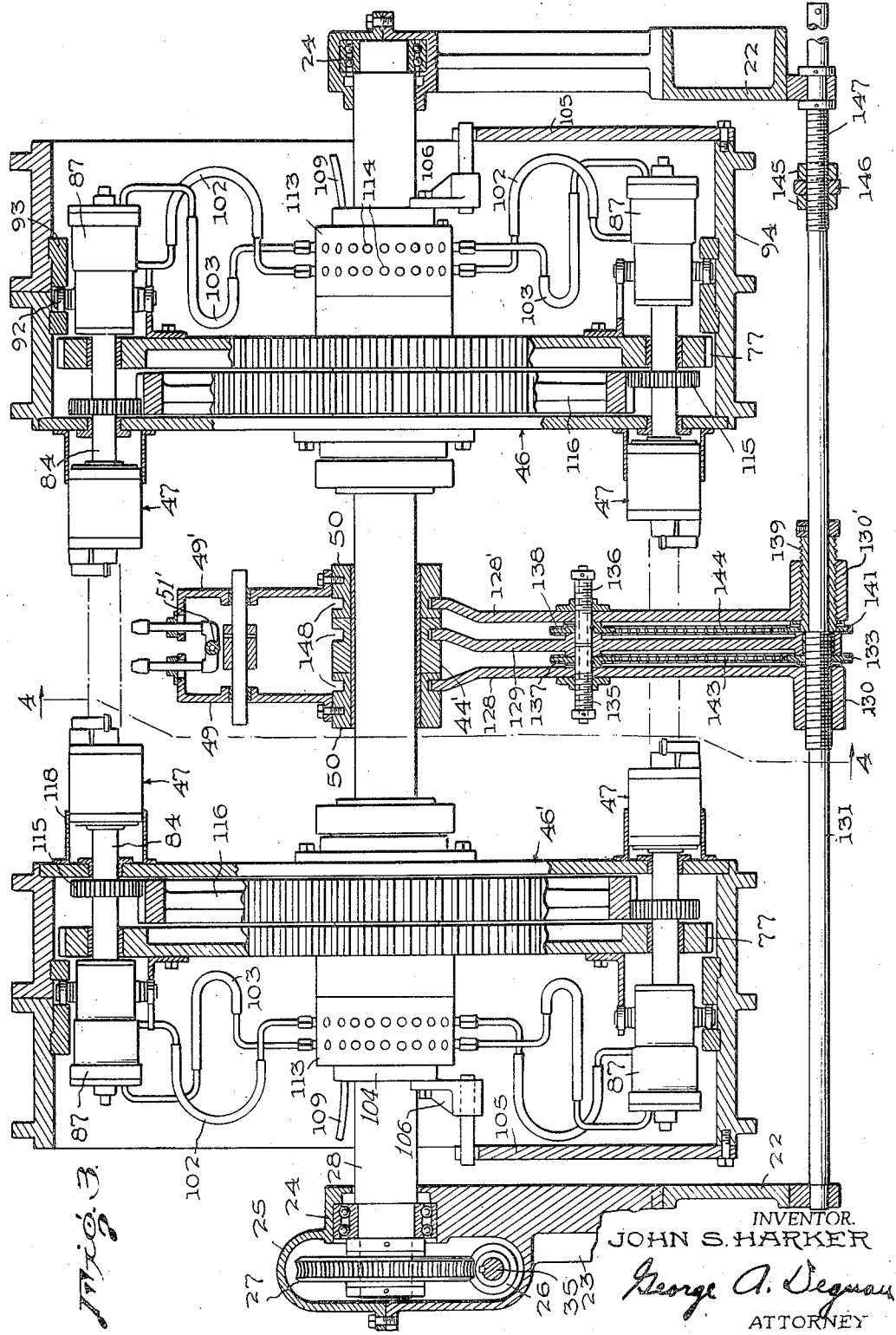

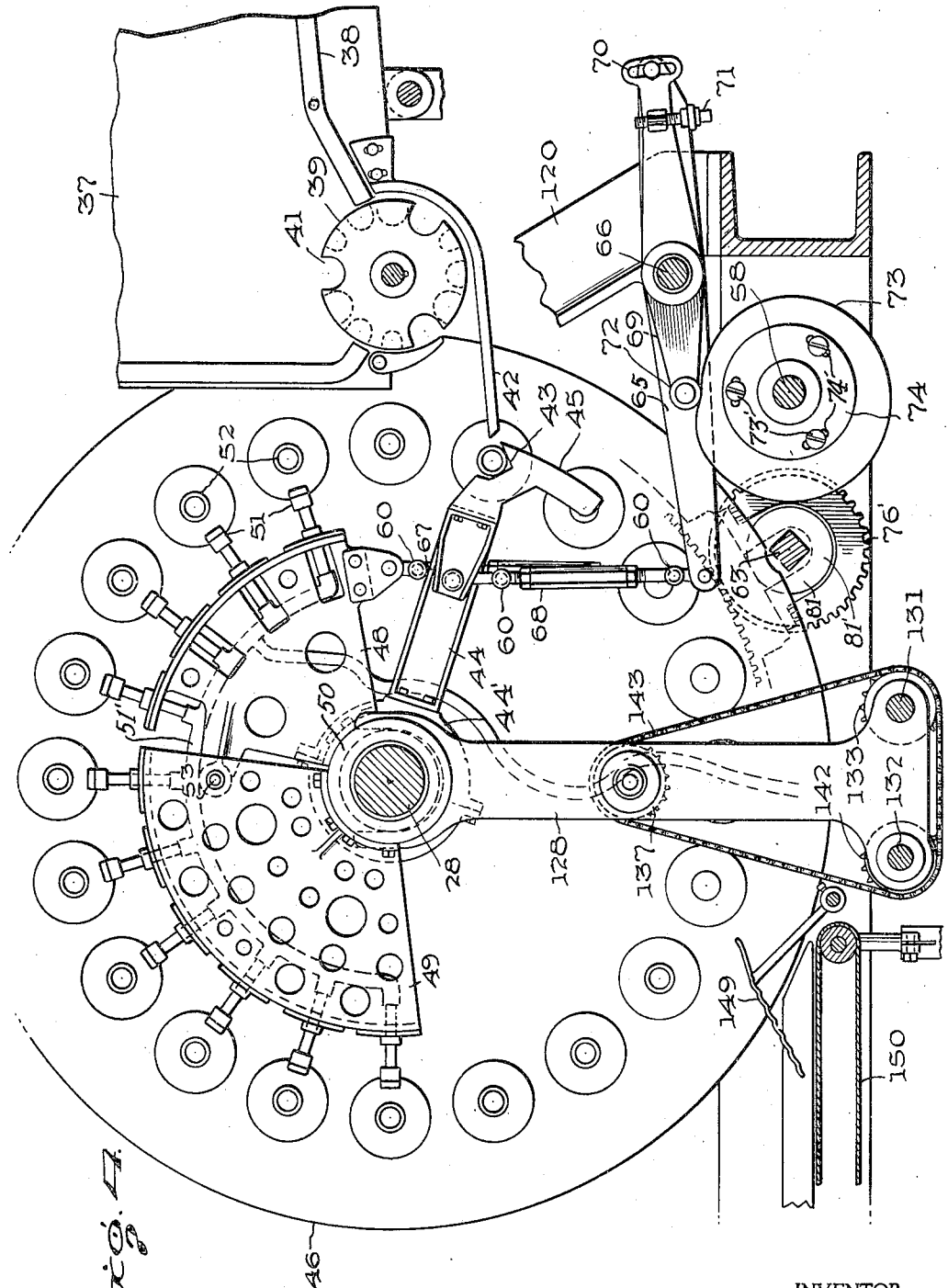

Jan. 10, 1950  J. S. HARKER  2,494,387
GLASS WORKING MACHINE
Filed Sept. 10, 1943  8 Sheets-Sheet 7
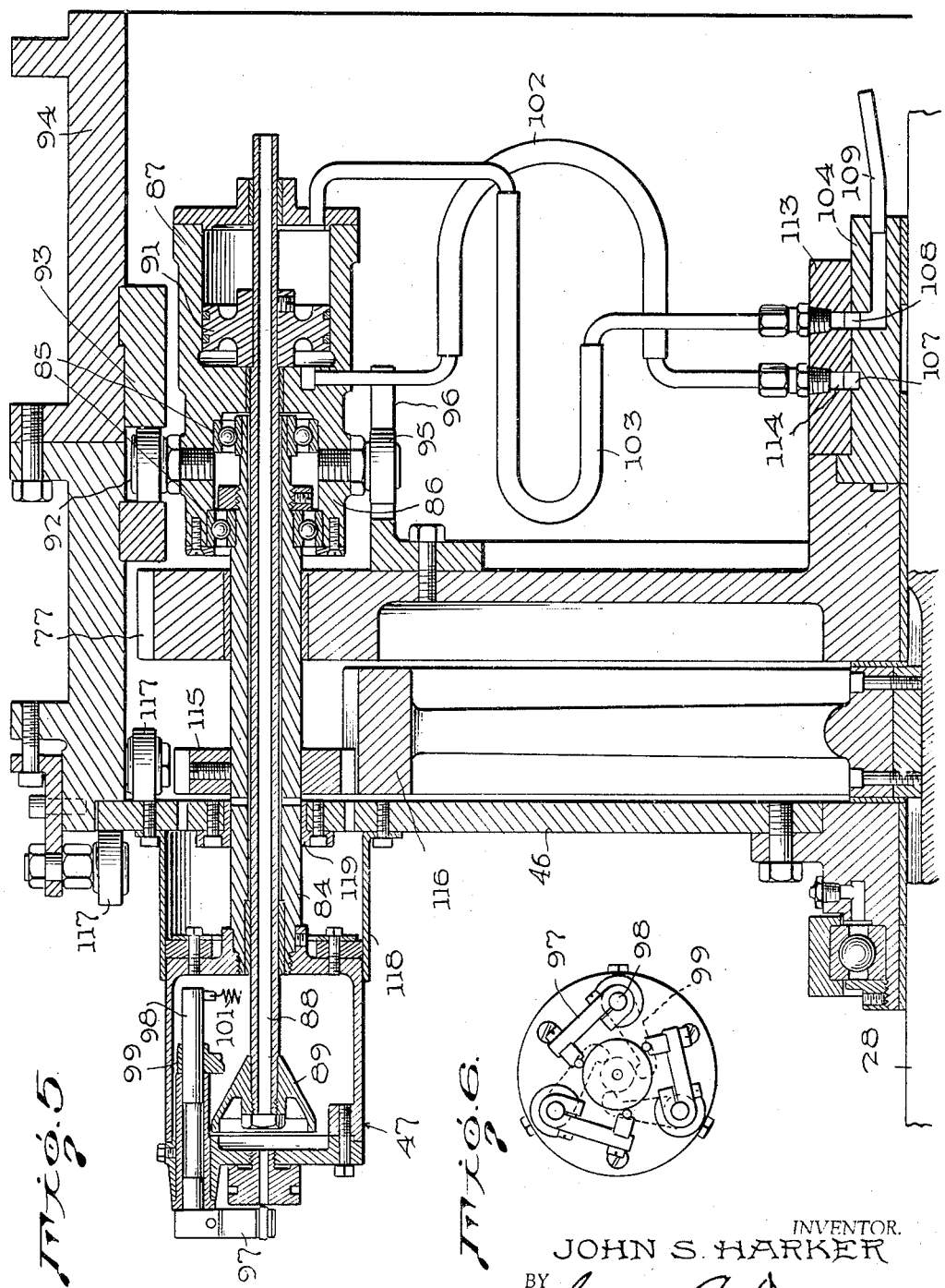
INVENTOR.
JOHN S. HARKER
BY George A. Degnan
ATTORNEY Jan. 10, 1950
J. S. HARKER
2,494,387
GLASS WORKING MACHINE
Filed Sept. 10, 1943
8 Sheets-Sheet 8
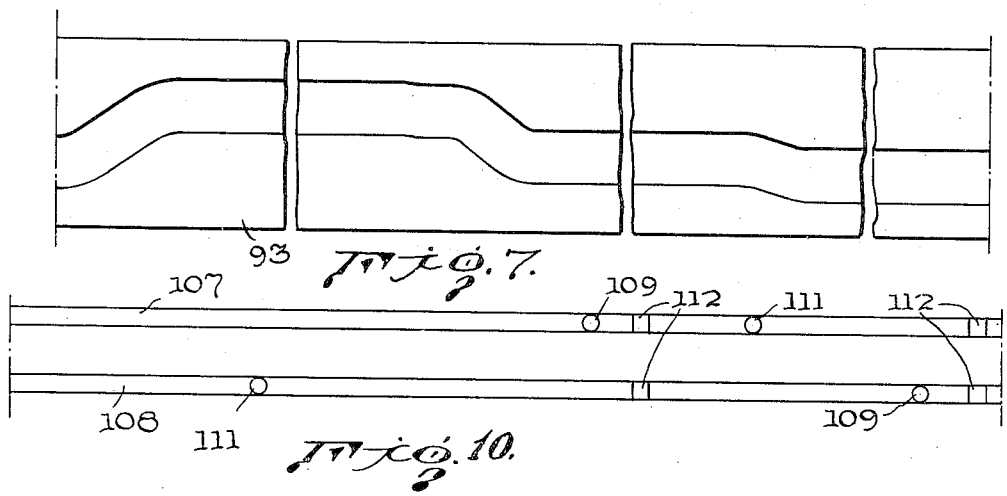
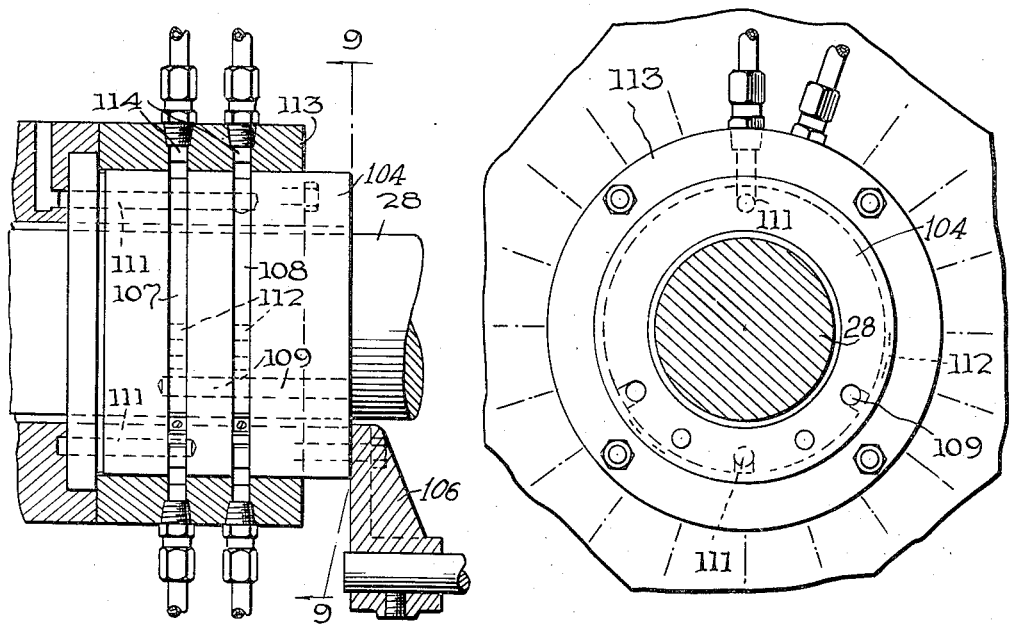
INVENTOR.
JOHN S. HARKER
BY George A. Degnan
ATTORNEY Patented Jan. 10, 1950

2,494,387

UNITED STATES PATENT OFFICE 2,494,387

GLASSWORKING MACHINE

John S. Harker, Vineland, N. J., assignor, by mesne assignments, to Owens-Illinois Glass Company, Toledo, Ohio, a corporation of Ohio Application September 10, 1943, Serial No. 501,875

6 Claims. (Cl. 49—7)

The present invention relates to dividing and bottoming tubular glass blanks by flames directed against the blanks. More particularly the invention relates to apparatus for directing fires against glass blanks on a conveyor and for controlling or timing the application of heat to the blanks in a manner to effect a substantial saving in the fuel used for heating.

In one form of machine now employed to halve and bottom tubular glass blanks, lengths of glass tubing are held by annularly spaced chucks mounted on a drum, the drum being rotated to carry successive blanks over a bank or series of burners arranged in arcuate formation concentrically with respect to the path of the chucks. The burners are stationary and project a multiplicity of closely spaced flames of substantially constant intensity. A machine of this type is shown in the patent to Koenig No. 1,688,190, in which, it will be noted, the carrier consists of rotating plates and the burners are stationary. The diameter of the chucks is considerably greater than that of the blanks. It is, therefore, obvious that the spacing between the blanks is much greater than the transverse section of a blank. Hence, the ratio of heat projected into the space between the blanks to that directed against the blanks is quite high. Obviously, a great amount of heat is wasted in this manner.

One of the objects of this invention is so to mount the burners that they travel for a limited distance at the same angular speed and concentrically with respect to the conveyors carrying the ware being heated.

Another object of the invention is to provide mechanism for oscillating the burners in the path referred to, the movement of the burners in a direction opposite to the travel of the ware being relatively much faster than the speed at which the blanks are moving.

Still another object of the invention is the provision of ware positioning mechanism permitting the chucks to engage the ware while the carrier is rotating.

A further object of the invention is to provide actuating mechanism for moving the chucks axially to permit them to engage the blanks at a predetermined position of their travel and pneumatically operated devices for closing the chucks on the ware.

Other objects of the invention will be apparent from the following description thereof taken in connection with the accompanying drawings, in which Figs. 1 and 1a, taken together, constitute a side elevation of a preferred embodiment of the invention;

Figs. 2 and 2a, taken together, constitute a top plan view, partly in section, of the lower part of the machine shown in Fig. 1;

Fig. 3 is a front elevation, partly in section and reduced, of the machine shown in Fig. 1;

Fig. 4 is a partial fragmentary section taken on line 4—4 of Fig. 3;

Fig. 5 is a partial section taken through the carrier, one of the chucks and the actuating mechanism therefor;

Fig. 6 is a front view of one of the chucks shown in Fig. 5;

Fig. 8 is a section through an air valve for controlling reciprocation of the chucks;

Fig. 9 is a fragmentary section on line 9—9 of Fig. 8; and

Fig. 10 is a development of the air valve shown in Fig. 8.

Figure 7A:
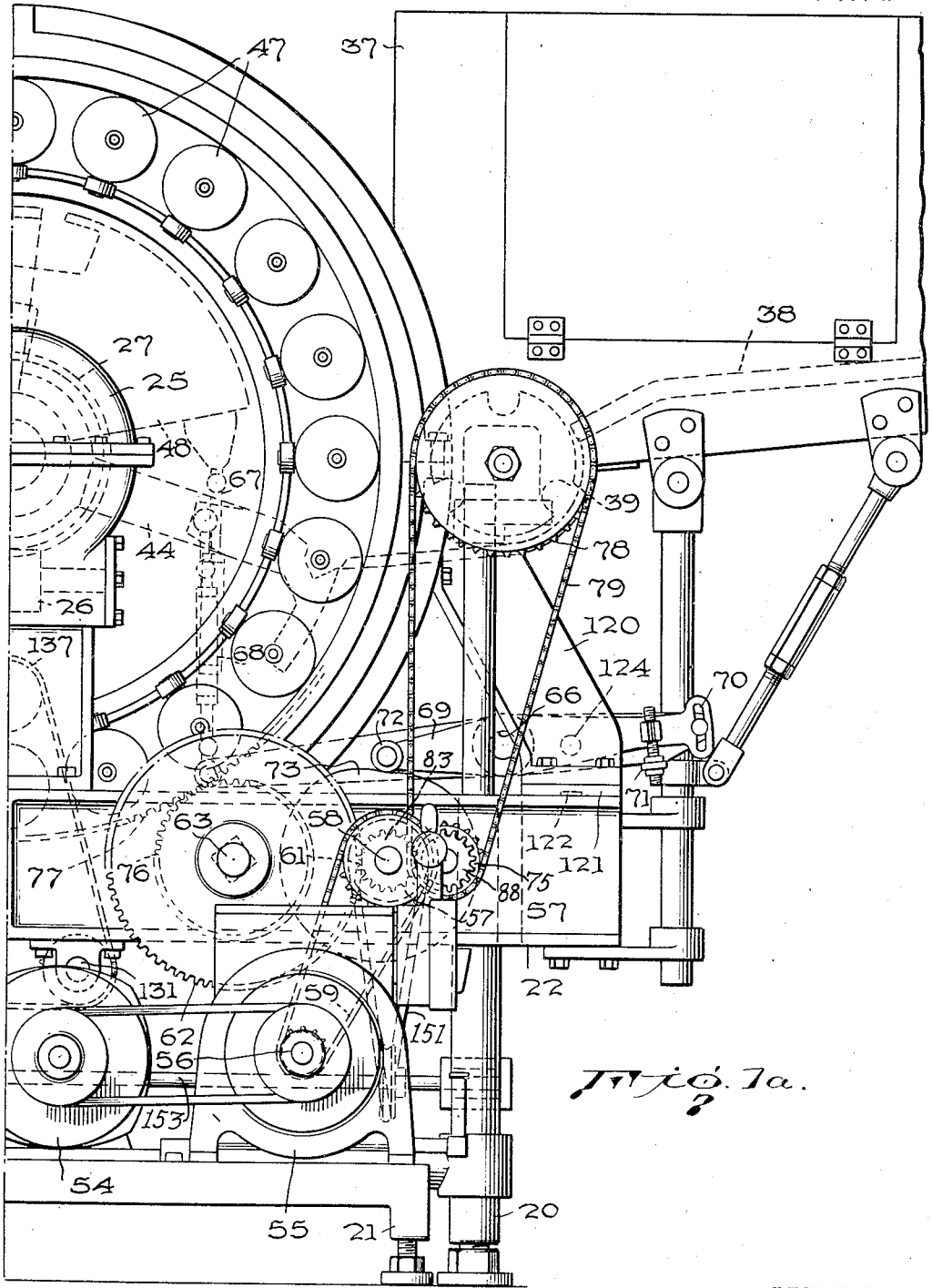
Fig. 7 illustrates a development of the cam for reciprocating the chucks, the cam being broken at several points.

Referring to the drawings, the base of the machine consists of a main frame 20, sub-frame 21, side members 22, and brackets 23. Mounted in brackets 23 are bearings 24 and housing 25 for worm 26 and worm wheel 27, the latter being fast on shaft 28. Motor 29 is supported on the side members 22 and, through speed reduction unit 31, drives sprocket 32. The latter drives sprocket 33 through a chain 34 or equivalent flexible drive means. Sprocket 33 and worm 26 are fast on worm shaft 35. Any suitable variable change speed mechanism may be used in the reduction unit and the speed of the worm varied by turning knob 36.

Supported on the base and forwardly thereof is a hopper 37 adapted to hold a supply of tubular glass blanks with their axes extending parallel to the axis of shaft 28. The bottom of the hopper comprises rails 38 inclined downwardly toward a rotary separator 39 having circumferentially spaced notches 41 each adapted to accommodate a single blank. The blanks are deposited by the separator on an inclined guide 42 from which they roll into notches 43 in oscillatable arms 44 pivoted on shaft 28. These arms have depending arcuate extensions 45 designed to prevent the next succeeding blank from rolling off the guide when the arms are elevated.

It will be seen that the conveyor or carrier comprises spaced circular plates 46, 46', free to rotate on shaft 28. The position of plate 46' on shaft 28 is preferably stationary, but the plate 46 is axially movable along the shaft to vary the spacing of the plates to accommodate blanks of different lengths, as will be explained further hereinafter. Each of the plates carries a plurality of equally and annularly spaced chucks 47, the chucks on one plate being axially aligned with those on the opposite plate. These chucks, as will be further described, are movable toward and away from each other at certain stages during rotation of the carrier to engage as well as to stretch the blanks after the latter have been heat softened and then releaes them when they have been halved and bottomed.

Disposed between the carrier plates and pivoted for oscillation about shaft 28 are segmental plates 48, 49, 49', each carrying a plurality of burners 51, supplied with fuel from a manifold 51' and directed, as shown in Figs. 3 and 4, toward blanks 52. Each of the plates carries a single row of burners but it is to be noted that plates 49, 49' are arranged side by side and that the burners on these latter plates are aligned to form pairs. The plates are connected by a bolt 53. It is to be noted that the spacing of the burners corresponds to the spacing of the chucks and that the distance between the rearmost burner and the notched positioning member is a multiple of the space between adjacent chucks.

The means for oscillating the arms 44 and the burner-carrying plates will now be described. Mounted on sub-frame 21 is a motor 54 connected to a variable speed reduction unit 55 through which sprocket 56 is driven. Sprocket 57 on cam shaft 58 is driven from sprocket 56 by chain 59. Gears 61, 62 on shafts 58, 63, respectively, rotate shaft 63. Rocker arms 64, 65 are pivoted on shaft 66 and are connected by links 68, 67 to burner carrier 48 and arm 44, respectively. Universal joints 60 at the ends of the links permit lateral adjustment of the burners and elevator arms while the rocker arms remain stationary, as will later be explained.

Levers 69 are also pivoted on shaft 66 and are adjustably connected to arms 65, each having an arcuate slot 70 therein by means of screws 71. Rocker 64 and levers 69 each has a follower 72 thereon bearing on cams 73, the latter being adjustably secured to cam plates 74 fast on shaft 58, arcuate slots 74' in plate 74 and set screws 73' on the cam permitting this adjustment. Thus, it will be seen that the arms 44 and the burner carriers are oscillated simultaneously and at the same speed. Since the machine is designed to accommodate ware of different diameters, it will be obvious that the position of the axis of the ware when deposited in the V-shaped notch 43 will vary, depending on the diameter of the blank. It is, therefore, necessary to adjust the relation of rockers 65 to rocker 69 when the machine is changed for blanks of another size. Hence the provision of the slot 70 and screw 71 which permits an adjustment of the angular relation of arms 65 with respect to arm 64. Reference to the shape of cam 73 will show that the rockers are elevated at a uniform rate which, by predetermined design, corresponds with the rotational speed of the chuck carriers so that in one direction the notches 43 and burners 51 are aligned and travel in an arcuate path with and at the same angular velocity as the chucks for some distance. However, immediately after the highest point of the cam passes its follower, the cam curve falls somewhat abruptly so that arms 44 and the burner carriers return to their initial positions at a much greater speed than that at which the burners move while traveling in the same direction as the chuck carrier. It will, therefore, be obvious that, during a single oscillation of the burners, heat is directly applied to the ware for a much longer time than that which is required for the burners to return to their initial position. In the cam illustrated, the curve is so proportioned that the ratio of heat application to return movement is about 7 to 1.

As hereinbefore stated, gear 61 is fast on shaft 58 to which is also secured sprocket 75. Gear 61 meshes with gear 62 on square shaft 63 to which is also secured two similar gears 76, 76', the latter being movable with carrier 46, to which yoke 81 is secured. This yoke engages collar 81' secured to gear 76' so that the gear is adjustably slidable on shaft 63 for a purpose to be described later. Gears 76, 76' in turn drive large gear wheels 77 which are freely rotatable on shaft 28. Sprocket 75 drives separator 39 through chain 79, sprocket 78 and gears 82, 83. Thus it will be seen that the burner carrier, the cams for elevating the ware and the burners, and the separator are all rotated in timed relation.

Referring to Figs. 3 and 5, it will be seen that the chucks 47 are mounted on hollow spindles 84, one end of each of which is journaled in bearings 85. These bearings are held in housing 86 forming part of cylinder 87, the spindle and cylinder being movable axially as a unit. Slidable in each of the spindles 84 is a second spindle 88 having a cone 89 secured to one end thereof. Piston 91 is secured to the other end of the spindle. Cam followers 92, shown as rollers, are mounted on housing 86 and engage a cam track 93, shown in development in Fig. 7, this track being fixed to the stationary main housing 94. Rollers 95 engaging guides 96 prevent rotation of cylinder 87, the guides being bolted to gear wheels 77 to provide straight line axial reciprocation of the chucks. Each of the chucks has three jaws 97 attached to shafts 98 to which are also secured arms 99. Springs 101 normally hold arms 99 against cone 89. The chuck actuator includes cylinder 87 to which compressed air is supplied and exhausted therefrom through hose connections 102, 103 to move piston 91 in either direction. The air is controlled by an annular stationary valve 104 shown in Figs. 8, 9, and 10. This valve is held to the base of the machine by upright 105 and bracket 106 so that it is non-rotatable. It will be seen from the drawings that the valve ring is provided with two parallel peripheral grooves 107, 108, which communicate with inlet and exhaust ports 109, 111. Filler blocks 112 in the grooves prevent air from flowing between those portions thereof communicating respectively with the inlet and exhaust ports. A second ring 113 secured to gear 77 and rotatable therewith has a series of radial openings 114 having communication through the hose connections 102, 103 with opposite ends of the cylinders 87. As ring 113 is rotated, openings 114 register successively with the inlet and exhaust portions of grooves 107, 108, thereby moving the cones toward and away from the end of the chucks to open or close the chuck jaws.

In Fig. 3 it will be seen that the chucks on the lower side of the carrier are withdrawn. The cam track 93 is so designed that the chucks move in to engage the ware as they approach arm 44. This arm is elevated at a speed corresponding with the rotation of the chuck carrier gear 77. As the chucks are aligned with the ware and move into engaging position, air is admitted to the rear of cylinder 87 to close the chuck jaws. The chucks then carry the ware over the burners. In addition to their circular travel, the chucks also rotate about their axes. It will be seen that a gear 115 is secured to each of the shafts 84 and that these gears mesh with gear 116 fast on shaft 28 which, as has been hereinbefore explained, is driven from motor 29. It is to be noted that gear 116 is relatively wide so that gear 115 is slidable along the teeth thereof but are in mesh during reciprocation of the chucks. Plates 46, 46' are mounted for rotation with the chucks and fit within housing 94, being guided by thrust bearings 117 on opposite sides of the plate. Plates 46, 46' carry shields 118 which serve to protect the chuck housings against dirt. Bearings 119 in the plates support the forward end of the chuck spindles.

The machine is designed to accommodate cylindrical blanks of various lengths and diameters and, for this reason, the distance between the chuck carriers may be adjusted. In the embodiment illustrated, the carrier 46' at the left in Fig. 3 is fixed in that it is not movable axially of shaft 28. Carrier 46, however, is movable toward or away from the opposite carrier. As shown in Figs. 1 and 1a, the carrier housings 94 are supported by brackets 120 at each side thereof. The brackets for supporting the axially movable carrier are fixed to plates 121 slidably mounted on keys 122 secured to the base. Secured to each bracket is a nut 123 with which threaded shafts 124 cooperate, and, when the latter are rotated, the brackets are moved in one or the other direction depending on the direction in which the shafts are turned. To permit simultaneous adjustment of both brackets shafts 124 have beveled gears 125 fast thereon cooperating with similar beveled gears 125' on shaft 126. Upon turning one of the shafts 124 by a crank or other suitable means, it is evident that both shafts will be rotated to provide for simultaneous adjustment of both of the housing brackets. At the same time, gear 76' being movable with carrier 46, is shifted laterally along square shaft 63.

When the distance between the carrier housings is changed, it is also necessary to center and adjust the burners. For this purpose the burners are so mounted as to be moved by similarly shaped triangular uprights 128, 128' and 129. Each of the uprights 128, 128' is provided with a threaded nut portion 130 cooperating with threads 155 on shafts 131, 132. Each upright is also provided with a threaded nut portion 130' accommodating threaded sleeves 139, 140, the latter having smooth bores to permit relative slidable movement thereof on shafts 131, 132, respectively. Sprockets 133, 134 are fixed to shafts 131, 132, respectively, and sprockets 141, 142 are secured to sleeves 139, 140. Upright 129 is positioned between the sprockets 133, 134, 141, 142. Intermediate their ends the uprights are apertured to receive threaded shafts 135, 136 to which are secured sprockets 137, 138. Chain 143 passes around sprockets 133, 137 and 142, and chain 144 around sprockets 134, 138 and 141. By turning shaft 131 it will be seen that sprockets 133, 137 and 142 are rotated simultaneously whereupon the threaded portion of shaft 131 and the threaded sleeve 140 will effect lateral adjustment of upright 128. Rotation of shaft 132 will turn sprockets 134, 138 and 141 and adjust upright 128'. The position of upright 129, which cooperates with collar 44', is not changed when either or both of shafts 131, 132 is turned. It is to be noted that the means for adjusting uprights 128, 128' are separate from each other. The purpose of having the threaded rods arranged in triangular relation is to move the standards simultaneously at three points, thus preventing canting of the standards and possible jamming thereof. It is also desirable that all of the burners be centered as a unit. Collars 145 are, therefore, fixed to shafts 131, 132 and a bridge 146 is mounted between these collars. The bridge is threaded to receive screw 147 which, on being turned, moves the bridge which, in turn, through collars 145, moves both shafts axially, carrying with them the uprights.

The adjusting uprights cooperate with annular grooves 148 in collars 44', 50 which are rotatable on shaft 28. Arm 44 and the segmental burner carriers 49, 49' are fixed respectively to collars 44' and 50. The universal joints 60 permit these adjustments without simultaneously moving the rockers to which the connecting links are attached. Subsequent adjustment of the rockers and the appropriate cams can then be made.

When the burners have been properly centered and adjusted laterally, each burner will direct a fire on a blank. The row of single burners first heats the blank to soften the glass. The chucks are then moved apart to halve the blank. Immediately thereafter pairs of aligned burners direct fires on the separated halves to bottom them.

After the ware has been bottomed, the chucks are opened to release the blanks which drop on a chute 149 from which they roll onto a conveyor belt 150, the latter carrying them to a suitable container. The conveyor belt is driven from shaft 58 through belts 151, 152 and countershaft 153.

From the foregoing description of the invention it will be apparent that the machine is flexible in its accommodation to ware of varying diameters and lengths. The motors 29 and 54 being independent of each other, rotational speeds of the carrier and the ware rotating means may be changed to suit particular requirements and timing for blanks within a relatively wide range of dimensions. The arrangements for oscillating the burners are also important in that a substantial saving in fuel is effected.

The various mechanisms and relation of parts shown in the drawings have been described with some particularity, but it is to be understood that the invention is not limited thereto but is capable of being embodied in a variety of forms.

Having described my invention, what I claim as new and desire to secure by Letters Patent is:

1. A glass-working machine of the class described comprising a plurality of oppositely aligned chucks arranged to hold glass ware, a pair of carriers for said chucks, means supporting reciprocating said chucks axially of said carriers, means for opening and closing said chucks including fluid operated actuators, and valve means operated in timed relation with said carrier for controlling the supply of fluid to said actuators.

2. A glass-working machine of the class described comprising a plurality of oppositely aligned chucks arranged to hold glass ware, a pair of carriers supporting said chucks, means for moving said carriers in a definite path, a burner unit positioned between said carriers for heating said ware, said unit comprising transversely spaced opposite burners and a burner disposed in a plane intermediate said spaced burners, said intermediate burner being spaced longitudinally of said spaced burners, said burners being positioned in heating relation to ware held in certain of said chucks when said unit is moving in one direction of its oscillation, means for moving all of said burners as a unit transversely with respect to said carriers, and other means for varying the spaced relation of said opposite burners.

3. A machine as claimed in claim 2 in which said other means comprises threaded rods for moving said opposite burners simultaneously in opposite directions in equal increments.

4. A machine as claimed in claim 2 in which said other means comprises standards cooperating with the burners, said standards each having three threaded apertures, and three threaded rods cooperating with said apertures for moving said opposite burners simultaneously in opposite directions in equal increments.

5. A glass-working machine of the class described comprising a plurality of oppositely aligned chucks arranged to hold glass ware, a pair of carriers supporting said chucks, means for rotating said carriers, a burner unit comprising a plurality of burner jets for heating said ware, positioning means for holding ware in alignment with said chucks, means for depositing ware on said positioning means, and means for oscillating said unit and said positioning means simultaneously in the same direction, said burner jets being positioned in heating relation to ware held in certain of said chucks when said unit is moving in one direction of its oscillation.

6. A machine as claimed in claim 5 in which the ware positioning means is spaced from the burners a distance equal to a multiple of the distance between adjacent chucks.

JOHN S. HARKER.

REFERENCES CITED

The following references are of record in the file of this patent:

UNITED STATES PATENTS

| Number | Name | Date |
|---|---|---|
| 806,168 | Morrison | Dec. 5, 1905 |
| 1,322,779 | Frederick et al. | Nov. 25, 1919 |
| 1,621,359 | Fagan et al. | Mar. 15, 1927 |
| 2,002,432 | Comoy | May 21, 1935 |
| 2,050,088 | Dichter | Aug. 4, 1936 |
| 2,125,017 | Halberson | July 26, 1938 |
| 2,227,224 | Kimble et al. | Dec. 31, 1940 |
| 2,284,089 | Hahn et al. | May 26, 1942 |
| 2,331,014 | Brown | Oct. 5, 1943 |
| 2,364,673 | Stuckert et al. | Dec. 12, 1944 |

FOREIGN PATENTS

| Number | Country | Date |
|---|---|---|
| 256,817 | Germany | Feb. 20, 1913 |
| 527,692 | Great Britain | Oct. 14, 1940 |
| 852,138 | France | Oct. 16, 1939 |